United States Patent Office 3,317,571
Patented May 2, 1967

3,317,571
TRIS(N,N - DIMETHYLFORMAMIDE)MOLYBDE-
NUM TRICARBONYL AND PROCESS FOR PRE-
PARING SAME
Robert P. M. Werner and Thomas H. Coffield, Farming-
ton, Mich., assignors to Ethyl Corporation, New York,
N.Y., a corporation of Virginia
No Drawing. Filed Aug. 22, 1961, Ser. No. 133,026
3 Claims. (Cl. 260—429)

This invention relates to novel organometallic compounds and methods for their preparation. More particularly, this invention relates to organometallic compounds in which an amide or thioamide is bonded to molybdenum through the oxygen or sulfur present in the configurations

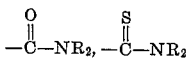

An object of this invention is to provide a novel class of organometallic compounds. Another object is to provide a novel class of organometallic compounds in which an amide or thioamide compound is bonded to molybdenum through a sulfur or oxygen linkage. A further object is to provide a novel class of stable amide and thioamide-molybdenum compounds. Other objects will become apparent from the following discussion.

The above objects are accomplished by providing organometallic compounds of molybdenum in which one or more molecules containing an amide or thioamide linkage are bonded to the metal atom through a sulfur or oxygen linkage, which compound is stabilized by additional covalent bonding to a plurality of carbonyl groups.

The compounds of this invention may be represented by the formula:

$$P'_x Mo(CO)_y \qquad (I)$$

wherein P' is a compound selected from the group consisting of amide and thioamides which is bonded to molybdenum through a sulfur or oxygen linkage, $x$ and $y$ are integers ranging from one to four, $x+y=7-L$ where L equals the number of amide and thioamide oxygen and sulfur atoms within a molecule of P', and the molybdenum atom has the electronic configuration of xenon.

Compounds of this invention are quite different from any compounds heretofore known. Our compounds contain an organometallic moiety which does not exist by itself but occurs only as part of a new compound in which the metal is bonded to an amide or thioamide compound through an oxygen or sulfur linkage. As an example, one of our new compounds, tris-dimethylformamide molybdenum tricarbonyl, is a stable compound of entirely unique structure. In this novel compound, which has the structural formula:

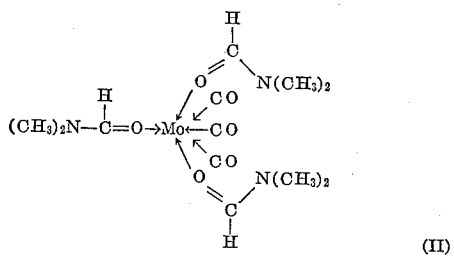

(II)

molybdenum has the electron configuration of xenon through donation of 12 electrons to the molybdenum atom. Six of these electrons come from three dimethylformamide molecules with each oxygen atom donating two electrons. Six additional electrons are donated by the three carbonyl groups with each carbonyl group donating two electrons. If one were to take away the three dimethylformamide molecules from this compound, there would be left a molybdenum tricarbonyl fragment which does not exist as a compound.

The amide and thioamide compounds coordinated to the metal in the compounds of this invention are represented by P' in the above formula, (I). These compounds are alkyl, alkylene, alicyclic or aralkyl amides or thioamides. The hydrocarbon moiety satisfying the fourth valence of the carbonyl carbon atom can contain from one to about 8 carbon atoms and can be completely saturated or may contain olefinic linkages. These groups may have either straight or branched chain or cyclic configurations. The cyclic configurations may have hydrocarbon substituents on the ring. However, the total number of carbon atoms present may not exceed about eight. The amide or thioamide nitrogen atom can be linked to two methyl or two ethyl groups. These are the preferred compounds. However, N-ethyl, N-methyl derivatives also are applicable in our process.

The requirement as to the number of carbon atoms is determined by steric considerations. Having more than the specified number of carbon atoms may make the molecules so bulky that they cannot be bonded to the molybdenum atom to form the compounds of our invention. Secondly, the solubility of the molecules in a hydrolytic solvent such as water or methanol may be so reduced by the presence of large hydrophobic hydrocarbon radicals that the compounds will not undergo the important displacement reactions described herein. Derivatives of diamides formed from dibasic acids such as adipic, fumaric, oxalic and phthalic acids are utilizable in our process. As above, the amide and thioamide nitrogen atoms must be disubstituted and the substituents can be independently selected from the class consisting of ethyl and methyl radicals. Similar derivatives of the triamides of tribasic acids like citric acid can also be used. Because of their availability, the compounds dimethylformamide, diethylformamide, and the N,N-dimethyl and N,N-diethyl derivatives of acetamide, propionamide, and butyramide are preferred as starting materials to form the new class of compounds comprising this invention.

The corresponding seleno and telluro amides in which a selenium or tellurium atom is doubly bonded to the carbon atom which is also bonded to the nitrogen atom, are closely analogous to the amides and thioamides used in forming the compounds of our invention and can, therefore, also be used in forming our novel compounds.

The novel compounds of this invention are susceptible to preparation by several methods. One method comprises reaction of the above described amide with a compound selected from the group consisting of compounds having the formula $Q_x Mo(CO)_y$ wherein Q is a compound selected from the group consisting of saturated ethers and saturated thioethers which is bonded to molybdenum through a linkage selected from the group consisting of sulfur and oxygen atoms, and $x$ and $y$ are integers ranging from one to 4, $x+y=7-L$ where L equals the number of ether and thioether linkages in a molecule of Q, and the molybdenum atom has an electronic configuration isoelectronic with xenon. The second method consists of reacting the N-dialkyl amide compound with molybdenum hexacarbonyl itself. The third method consists of reaction of the amide or thioamide with a pi arene complex of molybdenum tricarbonyl.

When the amide or thioamide compound is reacted with the ether or thioether compound described above, usually a large excess of the amide is used to drive the reaction toward completion. The amide can be used in a molar excess having a value of about two to about 500. We prefer to use excesses in the range of about 5 to about 100. The amide, therefore, performs two functions. Besides being a reactant, the excess acts as a solvent. The reaction proceeds quite readily. The process can be carried out at temperatures between −10° C. and 150° C. A preferred temperature range is between 20° and 90° C. An inert gas such as nitrogen, xenon, krypton or argon is preferably used to blanket the reaction mixture. Because of its commercial availability, nitrogen is the inert gas of choice. The process proceeds smoothly at atmospheric pressure. However, pressures as high as 150 atmospheres or as low as 0.1 atmosphere can be utilized. The reaction mixture is preferably agitated to increeas the reaction rate. Agitation is not essential, however. The reaction time is usually between 1–5 hours.

Our products can be formed from the reaction of the amide or thioamide with molybdenum hexacarbonyl itself. Generally, at least three equivalents of amide or thioamide are utilized for each mole of molybdenum hexacarbonyl. However, if more than three equivalents of the amide reactant are used per mole of molybdenum hexacarbonyl, a higher yield is obtainable; hence, a molar ratio of about 1.2 to about 500 can be used. We prefer to use a molar ratio of about two to about 100. During the course of the reaction it is preferred to blanket the reaction mixture with an atmosphere of an inert gas as mentioned above. We generally employ a reaction time of 1–5 hours. The reaction proceeds smoothly at atmospheric pressure. However, pressures as high as 150 atmospheres and as low as 0.1 of an atmosphere can be utilized. Again, the amide compound performs a dual purpose; that is, it is both a reactant and a solvent. If more solvent is found necessary, an inert hydrocarbon solvent as petroleum ether or n-octane can be used. The reaction can be carried out from about 70–150° C. A preferred temperature range is from about 90° to about 140° C.

A further process for forming our compounds involves reaction between a compound selected from the group consisting of thioamides and amides, as defined above, with a pi arene molybdenum carbonyl compound. These compounds are known in the art and examples thereof are benzene molybdenum tricarbonyl, mesitylene molybdenum tricarbonyl, and anisole molybdenum tricarbonyl. The amide compound displaces the aromatic compound to form the products of this invention. This reaction is generally carried out using a large excess of amide or thioamide compound to drive the reaction to completion. As above, we prefer to use about five to about 100 moles of amide per mole of pi arene Mo tricarbonyl. An inert solvent can be used but is generally not necesasry because the amide compound again acts both as a reactant and as a solvent. This process may be carried out using a temperature range between 50 and 180° C. A preferred temperature range is from about 80° to about 130°C. Since this temperature range promotes the formation of our compounds in optimum yield. The reaction proceeds smoothly at atmospheric pressure. However, pressure as low as 0.1 of an atmosphere and as high as 150 atmospheres can be utilized. The aromatic compound preferably is removed during the course of the reaction to facilitate disturbance of the equilibrium and, force the reaction to proceed essentially to completion. We prefer to remove the aromatic compound by continuous distillation. Therefore, the temperature of the reaction mixture is maintained at a sufficiently high temperature to distill the aromatic compound at the pressure used. Again, the process is generally carried out under a protective atmosphere of an inert gas, examples of which are given above. Agitation of the reaction mixture is not essential, but is normally used in order to allow the reaction to proceed smoothly and to speed up the reaction rate. The preferred reaction time is about one to about five hours.

The compounds of our invention are readily separated from the reaction mixture by conventional means. Solid products may be separated from the reaction mixture by filtration, crystallization, extraction or sublimation. Liquid products may be separated by distillation or extraction. Chromatography is a further means for separating either solid or liquid compounds of our invention from the reaction mixture.

The following examples illustrate our novel compounds, the process used in their preparation, and their utility as chemical intermediates to form new and useful chemical compounds.

*Example I*

Into a suitable reaction vessel, equipped with heating, stirring and condensing means, attached to a gas measuring device was placed 13.2 parts of molybdenum hexacarbonyl and 38 parts of dimethylformamide. During the course of the reaction the reaction mixture was carefully blanketed with an atmosphere of nitrogen. The temperature was raised slowly to 90° C., at which point gas evolution appeared. After one hour at 125–140° C. the reaction was considered essentially complete because of the volume of gas collected. Cooling to room temperature caused precipitation of bright yellow crystals. These crystals were filtered, washed with ether, and petroleum ether, dried, and freed from traces of molybdenum hexacarbonyl by sublimation. The yield was 65 percent. The compound formed was soluble in water, ethanol and tetrahydrofuran, and slightly soluble in ether and insoluble in petroleum ether. It showed somewhat lower sensitivity toward oxidation than the analogous 2,5,8-trioxanonane complex. When heated in a nitrogen filled capillary, it decomposed without melting at 145–148° C. Aqueous solutions of the dimethylformamide compound underwent the same reactions with pyridine, ammonia etc. as did aqueous solutions of the 2,5,8-trioxanonane complex. The infrared spectrum of this product, tris(dimethylformamide)molybdenum tricarbonyl, showed bands at 2.9 3.4, 5.1, 5.2, 5.4, 5.8, and 6.1 microns.

*Analysis.*—Calculated for $C_{12}H_{21}MoN_3O_6$; C, 36.1; H, 5.30; N, 10.53; Mo, 24.4. Found: C, 37.7; H, 5.51; N, 10.4; Mo, 24.1.

In an identical run in which the reaction mixture contained 11 parts of benzene, 16 parts of dimethylformamide, an 80 percent yield of the same product as above was obtained. No benzene molybdenum tricarbonyl could be isolated. Using similar conditions, N,N-diethylpropionamide, N,N-diethylacetamide, and N,N-diethylbutyramide yield tris(N,N-diethylpropionamide)molybdenum tricarbonyl, tris(diethylacetamide)molybdenum tricarbonyl, and tris(N,N - diethylbutyramide) molybdenum tricarbonyl.

*Example II*

In a suitable reaction vessel equipped with heating, stirring and condensing means, 3 parts of 2,5,8-trioxanonane molybdenum tricarbonyl was dissolved in 45 parts of dimethylformamide. Evolution of heat was observed. Addition of ether to the clear brown solution which had been previously filtered through celite precipitated yellow crystals which were identified as tris(dimethylformamide) molybdenum tricarbonyl. The yield was 80 percent. Similarly, N,N-diethylbutyramide and N,N-dimethylacetamide react to yield the corresponding tricarbonyl compounds, tris(N,N-diethylbutyramide)molybdenum tricarbonyl and tris(N,N-dimethylacetamide)molybdenum tricarbonyl, by displacement of the tridentate ether.

*Example III*

In a suitable reaction vessel equipped with heating, stirring and distilling means is placed 3 parts of benzene molybdenum tricarbonyl and 50 parts of dimethylformamide. The reaction mixture is kept blanketed with a protective atmosphere of nitrogen. The temperature is maintained at 80° C. for about 3 hours. After this time the reaction mixture is cooled and the yellow crystalline product precipitates. This precipitate is filtered and washed once with ether and three times with petroleum ether and dried. The product is identical to that obtained above.

Similarly, other triamide molybdenum carbonyl complexes such as N,N-diethylpropionamide molybdenum tricarbonyl, N,N-dimethylbutylamide molybdenum tricarbonyl and N,N-diethylacetamide molybdenum tricarbonyl are prepared from the corresponding amide and the pi arene complexes, mesitylene molybdenum tricarbonyl, toluene molybdenum tricarbonyl and anisole molybdenum tricarbonyl.

*Example IV*

Into a suitable reaction vessel equipped with heating, stirring and condensing means, a mixture of 13.2 parts of molybdenum hexacarbonyl, 54 parts of dimethylacetamide and 16 parts of benzene was introduced. The mixture was refluxed at 114–115° C. for 4½ hours. During this time the reaction mixture had been kept blanketed by an atmosphere of nitrogen. After the reaction was complete, all original solute had dissolved and the resulting red solution was filtered under nitrogen, while hot, through celite. On cooling, a greenish yellow crystalline material appeared. It was filtered, washed thoroughly with petroleum ether and dried. A trace of unreacted molybdenum hexacarbonyl was removed by sublimation. The product decomposed when exposed to air. An analytical sample was recrystallized from a hot mixture of dimethylacetamide and benzene.

Calculated for $C_{15}H_{27}N_3MoO_6$: C, 40.82; H, 6.17; N, 9.52; Mo, 21.74. Found: C, 40.7; H, 6.22; N, 9.43; Mo, 21.7. A similar run was carried out, excluding benzene, and this run is given in the next example. The same product, tris(dimethylacetamide)molybdenum tricarbonyl, is obtained.

*Example V*

In a suitable reaction vessel equipped with heating, stirring and condensing means was placed a mixture of 6.6 parts of molybdenum hexacarbonyl and 45 parts of dimethylacetamide. The reaction was stirred and heated at 145–165° C. for 3½ hours. During the reaction course, all starting materials had dissolved and the solution changed from yellow to deep red. After cooling, this deep red solution yielded a greenish yellow crystalline precipitate. It was filtered under nitrogen, washed thoroughly with petroleum ether and dried in vacuo. Yield of this air sensitive material, after removal of a trace of molybdenum hexacarbonyl by sublimation, was 50.9 percent. This material was identical with the one obtained in the run in which benzene was used. Under similar conditions, N,N-dimethylpropionamide and N,N-dimethylbutyramide and N,N-diethylacetamide and N,N-diethylpropionamide yield similar tricarbonyls, tris(N,N-diethylpropionamide)molybdenum tricarbonyl, tris(N,N-dimethylbutyramide)molybdenum tricarbonyl, tris(N,N-diethylacetamide)molybdenum tricarbonyl, tris(N,N-diethylpropionamide)molybdenum tricarbonyl.

*Example VI*

A solution of 5.3 parts of tris(dimethylformamide) molybdenum tricarbonyl and 45 parts of methanol was added to a stirred solution of 9.3 parts of dodecylamine in 64 parts of methanol. Immediately, an almost colorless, voluminous precipitate appeared. The precipitate was separated from the reaction mixture by filtration, was washed with methanol, ether, petroleum ether, and dried. The waxy product melted at 92° C. (nitrogen filled capillary). It was fairly stable in air, insoluble in water, slightly soluble in benzene, petroleum ether and methanol, and soluble in acetone, pyridine and carbon tetrachloride.

Calculated for $C_{39}H_{51}MoN_3O_3$: C, 63.64; H, 11.09; N, 5.70. Found: C, 63.4; H, 11.3; N, 5.68. The infrared spectrum shows absorption maxima at 3.0, 3.5, 5.35, 5.7, 5.9 and 6.3 microns. The product was tris(dodecylamine)molybdenum tricarbonyl.

The type of reaction exemplified in the last example is generally carried out at atmospheric pressure. However, pressures as low as 0.1 of an atmosphere and as high as 150 atmospheres can be used. The temperature range employed for this type of reaction is about −40 to about 100° C. The temperature range is governed by the choice of solvent and by the pressure employed. Generally, we prefer to use a temperature of about −30° to about 80° C. The process is practically instantaneous when the product is insoluble as in the previous example. Generally, in these cases, the reaction time is of rather short duration. Precipitation is usually enhanced by use of a lower temperature. Therefore, products that exhibit some solubility at room temperature can be obtained in higher yield if lower temperatures are used. Stirring the reaction mixture facilitates the process since homogenous reaction media favor increasing the rate of reaction. Stirring is not essential, however. When mixing the two solutions, usually one reactant is added in a fine stream to the stirred solution of the other reactant. We prefer this slow addition since purer, more crystalline products are obtained. However, dropwise addition and very rapid addition are also applicable. We prefer to allow the mixture to stand for some time after mixing to insure complete precipitation. The total time expended for mixing and allowing the product to completely precipitate is about two minutes to about two hours. A preferred time is from about 15 minutes to one and one-half hours. A hydrolytic solvent that is non-reactive toward the reactants and products is applicable. Water, ethanol, methanol, N-propanol, isopropanol, n-butanol, sec-butanol, isobutanol, tertiary butanol and ethyleneglycol are examples of this type of solvent. Water, methanol and ethanol are preferred solvents for this process. The choice of solvent is governed by the temperature and pressure employed and the solubility of the products and the solubility of the reactants.

However, this process is not limited to reactions wherein the product is insoluble in the solvent employed. Soluble products can be produced by this process. The following example exemplifies this variation.

*Example VII*

Into a suitable reaction vessel, 8 parts of tris(dimethylformamide)molybdenum tricarbonyl in 50 parts of methanol is added with stirring to 3 parts of triethylene tetraamine dissolved in 50 parts of methanol. Stirring is continued for one-half hour. No precipitate is obtained. The solvent is stripped from the reaction mixture at reduced pressure and room temperature. The resulting solid is then triturated with a small amount of ice cold diethylether, and then dried at the vacuum pump. The product is triethylene tetraamine tricarbonyl molybdenum.

When preparing a product soluble in the solvent employed, the same temperature and pressure ranges employed for preparation of an insoluble product are utilized. Generally, the reaction time is longer, in the order of 25 minutes to about 12 hours. We prefer to use a reaction time ranging from 30 minutes to 10 hours. Isolation steps analogous to those given in the preceding example are applicable. The products can also be isolated from the reaction mixture by other common processes. Such methods as distillation, extraction, chromatography and the like can be used. To facilitate the isolation of the product we prefer to use equi-molar amounts of the two reactants.

An excess of a reactant can be employed if that reactant is readily removable by one of the above techniques. When an excess of a reactant is employed we prefer to use the minimum excess which will drive the reaction nearly to completion. When using this technique, a molar ratio of about 1.1 to about 100 can be used. We prefer to use a ratio of about 1.2 to about 10.

Reactions of amide molybdenum carbonyls and ligands such as nitriles, phosphines, arsines, stibines and nitrogen containing heterocyclic compounds in a hydrolytic solvent were found to be suitable for preparation of many new and important compounds having new and useful properties. When the products are insoluble, the reaction rate is almost instantaneous and the yields are nearly quantitative. Further examples of the utility of this reaction are enumerated in the following table. All of the products mentioned below are insoluble in the solvent employed.

TABLE I

| Product | Reactant | Ligand | Solvent |
|---|---|---|---|
| $(C_{18}H_{37}NH_2)_3Mo(CO)_3$ | $(DMF)_3Mo(CO)_3$* | Octadecylamine | Methanol. |
| $[(C_6H_5)_3P]_3Mo(CO)_3$ | $(DMF)_3Mo(CO)_3$ | Triphenylphosphine | Do. |
| $[(C_6H_5)_3As]_3Mo(CO)_3$ | $(DMF)_3Mo(CO)_3$ | Triphenylarsine | Do. |
| $[(C_6H_5)_3Sb]Mo(CO)_3$ | $(DMF)_3Mo(CO)_3$ | Triphenylstibine | Do. |
| 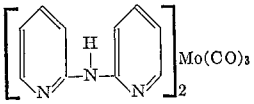 | $(DMF)_3Mo(CO)_3$ | 2,2′-di-pyridylamine | Do. |

*$(DMF)_3Mo(CO)_3$=tris(dimethylformamide)molybdenum tricarbonyl.

Similarly, triamine molybdenum tricarbonyl, diethylene triamine molybdenum tricarbonyl, pentamethyl diethylenetriamine molybdenum tricarbonyl, tris(acetonitrile) molybdenum tricarbonyl, tris(acrylonitrile) molybdenum tricarbonyl, tris(allylcyanide) molybdenum tricarbonyl, tris(benzonitrile) molybdenum tricarbonyl, tris(pyridine) molybdenum tricarbonyl, tris(tetrahydrofuran) molybdenum tricarbonyl, and bis[2,2′-dipyridylamine]molybdenum tricarbonyl can be prepared.

Interesting variations of the above procedure are possible. New complexes of molybdenum can be formed from the amide and thioamide molybdenum tricarbonyl compounds in the absence of solvent. When the displacing donor compound is used in excess to facilitate solution of the amide or thioamide molybdenum complex, two variations are possible. The product may be insoluble in the reaction mixture or it may be soluble therein. When the product is soluble, it may be precipitated by the addition of a solvent. The following are examples of these modifications.

*Example VIII*

One part of tris(N,N-dimethylpropyl amide)molybdenum tricarbonyl is dissolved in an excess of diethylene triamine. Slow addition of ether produces a crystalline product, identified as diethylene triamine molybdenum tricarbonyl.

*Example IX*

In the absence of solvent an instantaneous reaction occurs between cold dimethylamine (−20° C.) and tris-(N,N-diethyl acetamide)molybdenum tricarbonyl. The product is only slightly soluble at the boiling point of the amine (6° C.). The solid material isolated is washed with dimethyl amine and petroleum ether and dried under vacuum and is identified as tris(dimethylamine)molybdenum tricarbonyl. The following table is an illustrative but not limiting list of products obtainable when no solvent is employed.

TABLE II

| Product | Reactant | Ligand | Solvent |
|---|---|---|---|
| $(C_4H_{13}N_3)Mo(CO)_3$ | $(DMF)_3Mo(CO)_3$ | Diethylenetriamine | None. |
| $(CH_2=CH\ CN)_3Mo(CO)_3$ | $(DMF)_3Mo(CO)_3$ | Acrylonitrile | Do. |
| $(CH_2=CH—CH_2\ CN)_3Mo(CO)_3$ | $(DMF)_3Mo(CO)_3$ | Allylcyanide | Do. |
| $(C_6H_5CN)_3Mo(CO)_3$ | $(DMF)_3Mo(CO)_3$ | Benzonitrile | Do. |
| $(C_5H_5N)_3Mo(CO)_3$ | $(DMF)_3Mo(CO)_3$ | Pyridine | Do. |
| $(C_4H_8O)_3Mo(CO)_3$ | $(DMF)_3Mo(CO)_3$ | Tetrahydrofuran | Do. |
| 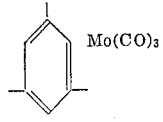 | $(DMF)_3Mo(CO)_3$ | Mesitylene | Do. |

(DMF)=Dimethylformamide.

Generally, the above two modifications are run at atmospheric pressure. However, pressures as low as .10 and as high as 150 atmospheres can be utilized. The temperature range for these modifications is from about −50° to about +50° C. A preferred temperature range is from about −30° to about +30° C. When the product is precipitated by the addition of a solvent, the nature of the solvent employed is governed by two considerations. The product must be insoluble in this solvent and the solvent must not react with the reaction mixture. Examples of such solvents are ether, petroleum ether and the like. The reaction time is governed by consideration of whether a soluble or insoluble product is formed. When an insoluble product is formed, the reaction times are generally quite short, in the order of 10 minutes to two hours. We prefer to use a reaction time of about 20 minutes to about one and one-half hours, to insure complete precipitation. When the product is soluble, a longer reaction time is employed in order to obtain the product in optimum yield. We prefer to use a reaction time of about 30 minutes to about 10 hours.

From the above discussion, it is apparent that the reaction between an amide or thioamide molybdenum carbonyl complex and a displacing ligand is limited only to the use of a ligand having greater donor properties than the ligand in the starting material.

These new compounds which may be formed from our ether compounds are useful antiknocks when added to petroleum hydrocarbons. Further, they may be used as supplemental antiknocks, that is, in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as an antiknock, these compounds may be present in the gasoline in combination with typical halogen scavengers such as ethylene dichloride, ethylene dibromide and the like.

Our novel compounds are not only useful intermediates as shown above but are further useful in their own right in metal plating applications. In order to effect metal plating with our novel compounds, they are decomposed in an evacuated space containing the object to be plated. On decomposition, they lay down a film of metal on the object contained within the enclosure. The gaseous plating may be carried out in the presence of an inert gas so as to prevent oxidation of the metal during the plating operation.

The gaseous plating technique described above finds wide application in forming coatings which are not only decorative but also protect the underlying substrate material. Since molybdenum is a conductor, this technique enables the preparation of printed circuits which find wide application in the electrical arts.

Deposition of metal on a glass cloth illustrates the applied processes. A glass cloth band weighing one gram is dried for one hour in an oven at 150° C. and dipped in one of our compounds. It is then placed in a tube which is devoid of air. The tube is heated at 400° C. for one hour after which time the tube is cooled and opened. The cloth has a uniform metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection and as a heating element.

Our compounds also find utility as additives for lubricating oils and greases to increase their antiwear activity. They are also used to control the rate of combustion of pyrophoric materials such as solid rocket propellants.

Our compounds are also biocidally active and find utility as fungicides, herbicides, pesticides and the like.

Having fully described our novel compounds, their mode of preparation and their manifold utilities, we desire to be limited only within the scope of the appended claims.

We claim:

1. Tris(N,N-dimethylformamide)molybdenum tricarbonyl.

2. A process for the preparation of the compound of claim 1, said process comprising reacting N,N-dimethylformamide with molybdenum hexacarbonyl.

3. A process for the preparation of the compound of claim 1, said process comprising reacting N,N-dimethylformamide with 2,5,8-trioxanonane molybdenum tricarbonyl.

References Cited by the Examiner
UNITED STATES PATENTS 3,065,250    11/1962    Levering _____ 260—429

OTHER REFERENCES

Muetterties: J. Amer. Chem. Soc., 82 (Mar. 5, 1960), pages 1082 to 1087.

Zeiss, H.: Ed., Organometallic Chemistry, No. 147, A.C.S. Monograph Series, Reinhold Publishing Corp., New York, N.Y. (1960), pages 482–484.

TOBIAS E. LEVOW, *Primary Examiner.*

W. J. VANBALEN, T. L. IAPALUCCI, A. P. DEMERS, *Assistant Examiners.*